Oct. 21, 1969    G. OLLEARO    3,473,419
AUTOMATIC TOOL CHANGING DEVICE FOR A MACHINE TOOL
Filed Aug. 31, 1966    5 Sheets-Sheet 1

Fig.1

INVENTOR.
GIORGIO OLLEARO
BY John Toggenburger
AGENT

Oct. 21, 1969   G. OLLEARO   3,473,419
AUTOMATIC TOOL CHANGING DEVICE FOR A MACHINE TOOL
Filed Aug. 31, 1966   5 Sheets-Sheet 2

Fig. 2

INVENTOR.
GIORGIO OLLEARO
BY John Toggenburger
AGENT

Fig. 3

INVENTOR.
GIORGIO OLLEARO
BY John Toggenburger
AGENT

United States Patent Office 3,473,419
Patented Oct. 21, 1969

3,473,419
AUTOMATIC TOOL CHANGING DEVICE
FOR A MACHINE TOOL
Giorgio Ollearo, Ivrea, Turin, Italy, assignor to Ing. C.
Olivetti & C. S.p.A., Ivrea, Italy, a corporation of Italy
Filed Aug. 31, 1966, Ser. No. 576,459
Claims priority, application Italy, Sept. 2, 1965,
20,432/65
Int. Cl. B23b 39/20, 29/24
U.S. Cl. 77—25                                28 Claims

ABSTRACT OF THE DISCLOSURE

An automatic tool changing device for a machine tool having a tool storage magazine storing in predetermined positions a plurality of tools selectively rotatable to locate a selected tool at a working station for operation on a workpiece. Power means are controllable to rotate the magazine selectively in opposite directions to locate the selected tool at the working station within the shortest travel distance possible.

---

This invention relates to an automatic tool changing device for a machine tool, comprising a tool storage magazine storing in predetermined positions a plurality of tools and selectively rotatable for locating a selected tool at a working station, power means conditionable for rotating said magazine in either of two directions, and a plurality of elements individually settable for selecting a corresponding tool of said plurality.

There are already known many automatic tool changing devices of the above type. Generally, to align the cutting tool with the spindle of the machine, the tool storage drum is rotated in a constant direction, whereby an average long time is required for changing the tool.

This disadvantage is obviated by the machine tool according to the invention, which is characterized in that a plurality of control members individually connected to said elements are secured to the machine frame coaxially with said magazine in a reverse order with respect to said tools, a cam secured to said magazine comprising a first portion adapted to engage half but one of said plurality of members so as to cause the member connected with the element so set to condition said power means to rotate said magazine in a predetermined direction when engaged, in an opposite direction when not engaged, said cam comprising also a second portion adapted to engage one member at a time so as to disable said power means when the tool corresponding to said set element is located in said working station.

This and other characteristics of the invention will become apparent from the following description of a preferred embodiment thereof, and from the accompanying drawings, wherein.

Figure 1:
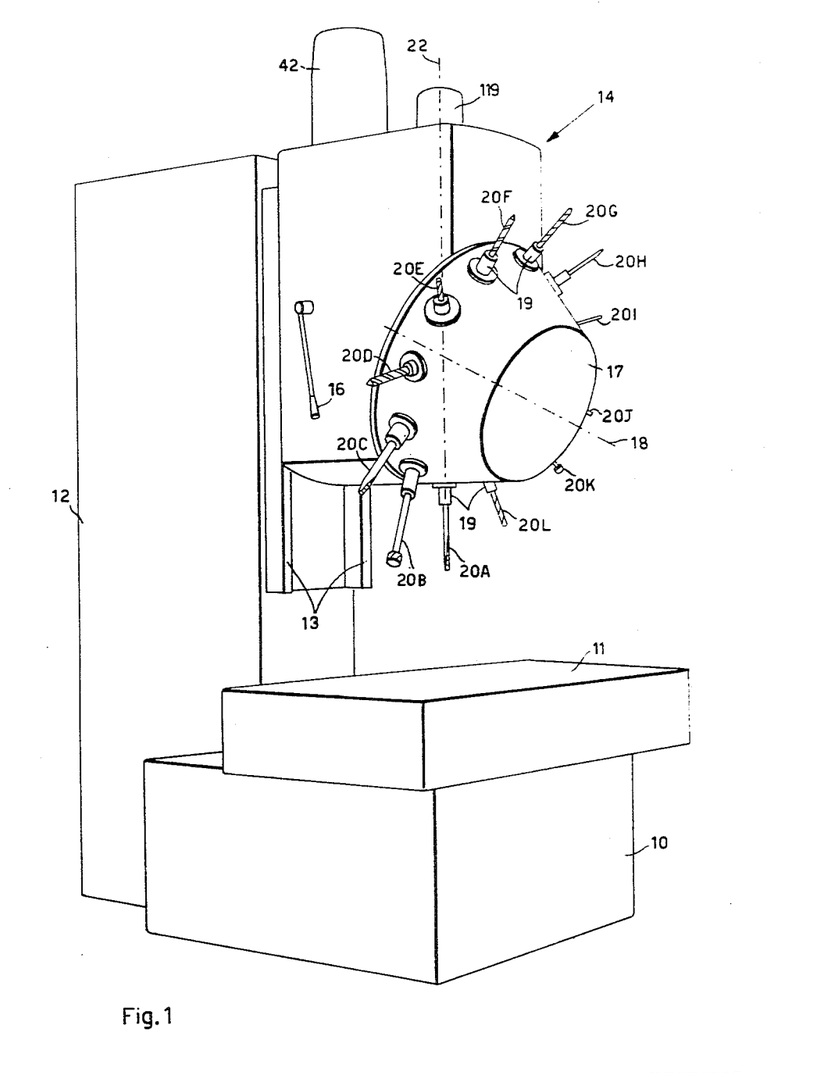
FIG. 1 is a perspective view of a machine tool having an automatic tool changing device according to the invention.

With reference to FIG. 1, the machine tool comprises a bed 10, which slidably mounts a conventional workpiece supporting table 11. The table 11 is displaced according to two horizontal directions under the control of a numerical control device known per se and not described here. Furthermore, the machine comprises an upstanding column 12 provided with two prismatic ways 13 slidably mounting an operating head, generically indicated by the numeral 14. The head 14 may be vertically displaced along the ways 13 and may be locked in the required position by a locking lever 16, in a manner known per se.

The operating head 14 is equipped with a spindle 21 (FIG. 2), rotatable around a vertical axis 22. Furthermore, the operating head 14 comprises a tool storage magazine formed on a frusto-conical shaped drum 17 rotatable around an axis 18. The axis 18 of the drum 17 intersects the axis 22 of the spindle 21 and is inclined with respect thereto a predetermined angle $\alpha$. The drum 17 is provided with a lateral surface 15 inclined with respect to the axis 18 and angle $\beta$, which is the complement of the angle $\alpha$. The lateral surface 15 is provided with a plurality of twelve tool housing cells 9 circumferentially arranged thereon. Each cell 9 is adapted to store a tool holding member or socket 19, holding a different cutting tool 20A, 20B . . . 20L with a proper axis 20' perpendicular to the surface 15, in such a position as to cause the drum 17 upon being selectively rotated to individually align the various tools 20 with the axis 22 of the spindle 21.

Integral with the drum 17 is a sleeve 23 rotatably mounted on a shaft 24 secured to a frame 26 of the operating head 14 (FIG. 1). The drum 17 is provided with an annular grooved guide 27 cooperating with an annular ledge 28 of the frame 26. Furthemore, integral with the sleeve 23 is a worm wheel 29 cooperating with a worm 32 (FIG. 7) secured to a shaft 33 rotatably mounted on the frame 26. The transmission ratio between the worm 32 and the wheel 29 is such as to advance the drum 17 one step for each revolution of the shaft 33.

The shaft may be driven by an electromagnetic clutch, generically indicated by the numeral 34, through a second worm wheel 35 meshing with another worm 36 (FIG. 6) secured to a vertical shaft 37. This latter through a pair of bevel gears 38 is driven by a horizontal shaft 39, which through a second pair of bevel gears 40 (FIG. 3) is driven by a vertical shaft 41 of a three phase induction electric motor 42, adapted to be selectively rotated in either direction.

To this end a first remote-control relay TX (FIG. 4) is adapted to actuate a contact TX1, which causes the motor 42 to rotate in such a direction as to drive the drum 17 clockwise in a known manner. Similarly a second remote-control relay TY is adapted to actuate a contact TY1, which causes the motor 42 to rotate in the opposite direction to drive the drum 17 counterclockwise. Two relays RX, and RY are individually adapted to close a contact RX1 and RY1 respectively, inserted in the circuit of the remote-control relay TX, and TY respectively. Furthermore, the two remote-control relays TX and TY are provided each one with a holding circuit, which is closed through a contact TX2 and TY2 respectively.

Figures 6, 7, 8:
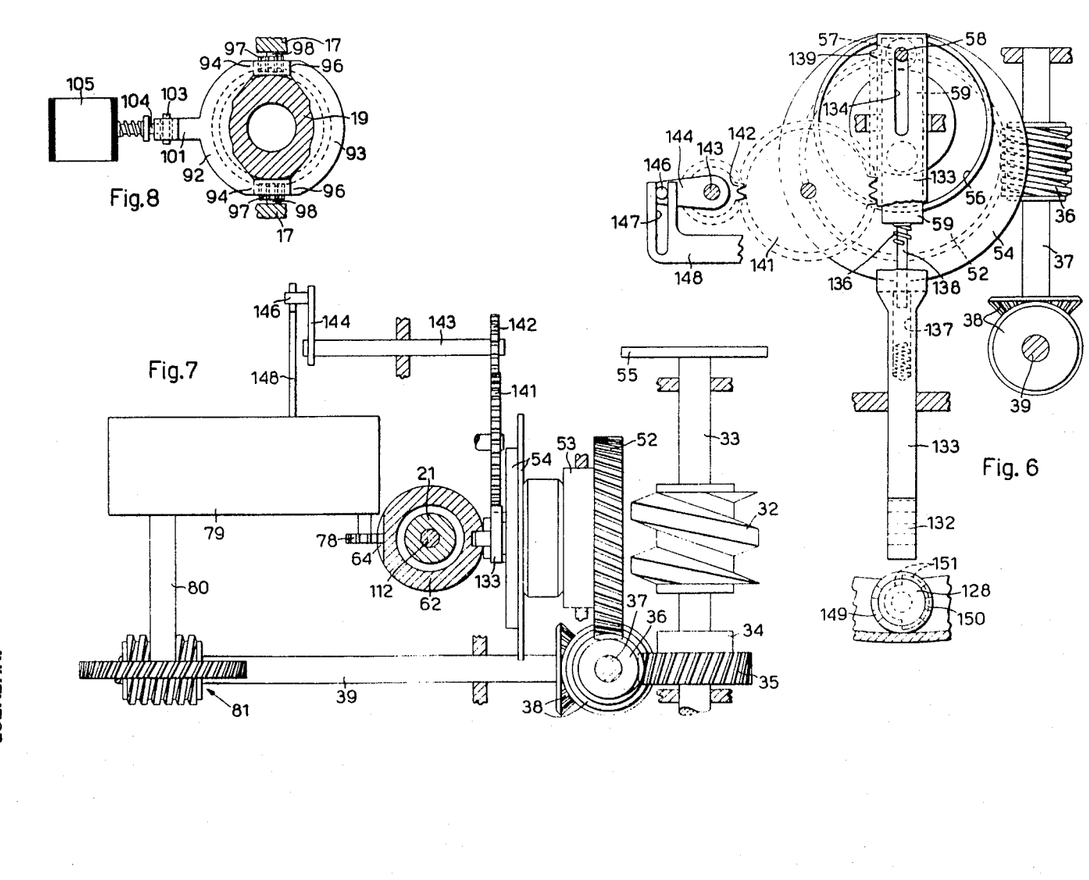
FIG. 6 is a partial view according to the line VI—VI of FIG. 2.
FIG. 7 is a partial plan view of the machine.
FIG. 8 is a partial plan view of a detail of the machine.

The two relays RX and RY are also adapted individually to close a contact RX2, and RY2 respectively, inserted in the circuit of an electromagnet EL controlling the electromagnetic clutch 34 (FIG. 7). Finally the electromagnet EL (FIG. 4) is provided with a holding circuit which is closed through a switch 50 normally held open by a notch formed on a disk 55 (FIG. 2) secured to the shaft 33, whereby when each cutting tool 20 is in alignment with the spindle 21, the holding circuit is open.

The stationary frame of the machine carries a plurality of individually settable elements or contacts 44A, 44B . . . 44L (FIG. 4) associated with the cutting tools 20A, 20B, . . . 20L. Each contact 44 may be automatically operated in a known manner according to the program of work, which may be recorded in a support and comprises tool identification data as well as data of the machining operation to be performed by each selected tool 20.

Secured to the stationary shaft 24 (FIG. 2) is a plate 43 mounting a plurality of three position electric switches 45A, 45B . . . 45L (FIG. 4) associated with the tools 20A, 20B . . . 20L, each switch 45 being series connected with the corresponding contact 44. The switches 45 are arranged coaxially with the drum 17 in a reverse order with respect to the tools 20 and are normally spring urged toward the outermost position to close a corresponding contact 45X inserted in a circuit 47 shown by solid lines, which feeds the relay RX.

Secured to the drum 17 (FIG. 2) is a semicircular cam 46 comprising a portion 48 (FIG. 4) adapted to simultaneously engage half but one switches 45, and a second portion 49 adapted to engage each time a single switch 45. The switches 45 engaged by the portion 48 of the cam 46 are held in the innermost position wherein they close a corresponding contact 45Y inserted in a circuit 51 shown by broken lines, which feeds the relay RY. The switch 45 engaged by the portion 49 of the cam 46 is conversely held in an intermediate position with respect to the above extreme positions, whereby it holds both contacts 45X and 45Y open.

Figure 2:
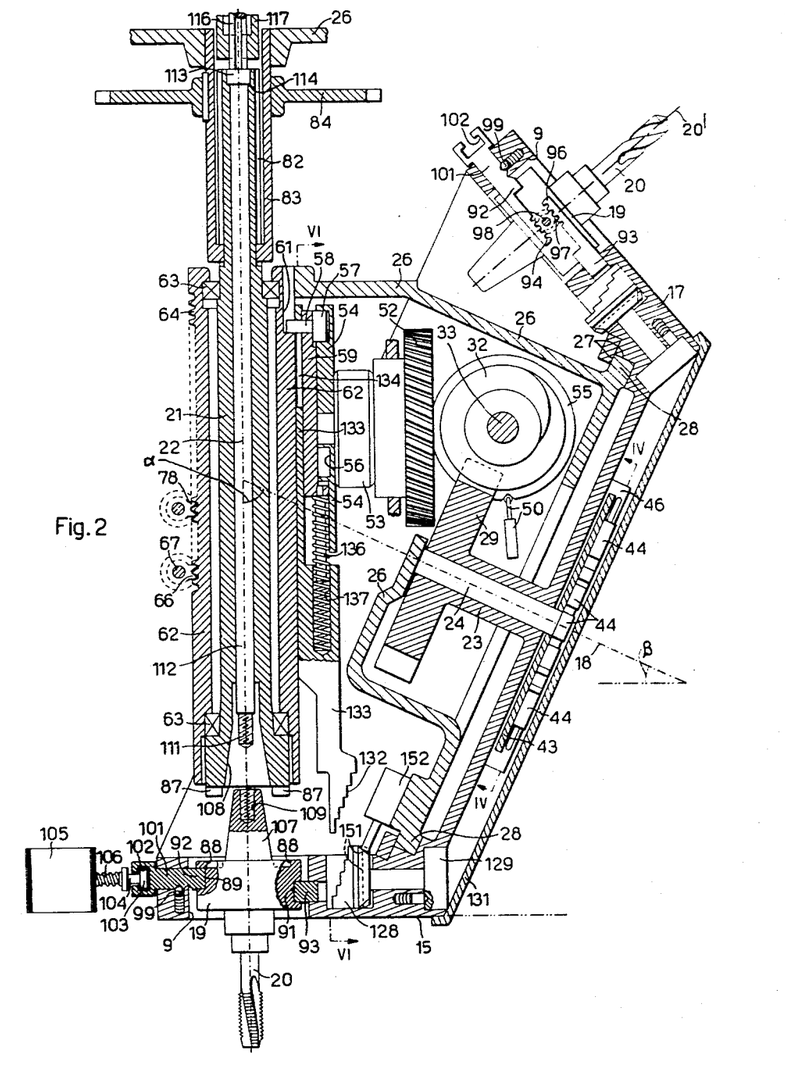
FIG. 2 is a partial longitudinal sectional view of the machine.

The worm 36 (FIG. 6) meshes with a worm wheel 52 adapted to rotate a disk 54 180 degrees by means of an electromagnetic clutch 53 (FIG. 2). The disk 54 is provided with an eccentric formed of an annular groove 56 (FIG. 6) engaged by a roller 57 rotatable on a pivot 58 carried by a slide 59 vertically slidable on the frame 26. The pivot 58 extends rear the slide 59 (at the left side in FIG. 2) and is adapted to slide along an axial groove 61 of a sleeve 62. This latter is vertically slidable on the frame 26 together with the spindle 21, which is rotatable within its sleeve 62 by means of two bearings 63.

The sleeve 62 is provided with a toothed portion 64 meshing with a pinion 66 secured to a shaft 67 rotatably mounted on the frame 26. Furthermore, secured to the shaft 67 is a second pinion 68 (FIG. 3) meshing with a rack 69, which is secured to a vertically slidable slide 70 of a position measuring transformer known per se and generically indicated by the numeral 71. The slide 70 is connected by means of a chain 72 with a piston 73 slidable in a cylindrical shell 74. A compression spring 76 located between the piston 73 and a locking disk 77 secured to the uppermost end of the shell 74 normally urges the piston 73 downwards. The toothed portion 64 (FIG. 2) of the sleeve 62 meshes also with a second pinion 78 controlling the working advancement of the spindle 21.

The numeral 79 (FIG. 7) generically indicates a speed changing device of the type operated by electromagnetic clutches in a known manner. The device 79 is inserted between the pinion 78 and a shaft 80, which in turn, through a worm gear 81 and an electromagnetic clutch not shown in the drawings, is driven by the horizontal shaft 39.

The upper end of the spindle 21 (FIG. 2) is provided with a fluted portion 82 engaging a sleeve 83 rotatably mounted on the frame 26. Secured to the sleeve 83 is a toothed wheel 84 adapted to be rotated by a shaft 85 (FIG. 3) connected to the motor shaft 41 by means of a second speed changing device 86, which is controlled in a known manner according to the recorded program of work. Furthermore, the lower end of the spindle 21 (FIG. 2) is provided with two projections 87 adapted to engage two recesses 88 formed on the socket 19 of each tool 20.

Each socket 19 is also provided with a pair of opposite locking portions or recesses 89 and 91 axially lying in different planes and normally engaged by a corresponding pair of jaws 92 and 93 (FIG. 8). Each jaw 92 and 93 is provided with two toothed edges 94 (FIG. 2), and 96 respectively, engaging at opposite sides two pinions 97 rotatable on two pivots 98 secured to the drum 17. Therefore, the two jaws 92 and 93 are always simultaneously displaced in opposite directions. The jaw 92 normally cooperates with a spring urged detent ball 99 and is provided with a projection 101 having a recess 102 adapted to cooperate with a flange 103 integral with an armature 104 of an electromagnet 105 secured to the frame 26. The armature 104 is normally urged rightwards by a spring 106.

Each socket 19 is also provided with a frusto-conical shaped portion 107 adapted to engage a tapered recess 108 of the spindle 21. The portion 107 is provided with a threaded hole 109 adapted to be engaged by a threaded end 111 of a rod 112 axially and rotatably mounted in the inner hollow of the spindle 21. The rod 112 is provided with a collar 113 cooperating with a step 114 of the spindle hollow. A fluted portion 116 (FIG. 3) of the rod 112 normally engages an internally fluted sleeve 117 constantly engaging also a fluted end of a shaft 118 (FIG. 3) of an auxiliary electric motor 119, of the type adapted to be rotated in either of the two opposite directions. Finally the sleeve 117 is provided with a pair of flanges 121, engaging a roller 122 of a lever 123 fulcrumed on a stationary pivot 124. The lever 123 is normally urged by a spring 125 to contact a stationary stop and is pin and slot connected with an armature 126 of an electromagnet 127.

The drum 17 (FIG. 2) mounts on the plane containing the axis 18 and each tool axis 20' a variably settable element formed of a stepped drum 128 adapted to be manually set by means of a corresponding knob 129, after having removed a protection cover 131 from the drum 17. The drum 128 corresponding to the tool 20 aligned with the spindle 21 may be sensed by a sensing member formed of a stepped portion 132 stepped in an opposite order with respect to the steps of the drum 128 and carried by a slide 133 slidable parallelly to the spindle 21 on the machine frame 26.

The upper end of the slide 133 is provided with a slot 134 (FIG. 6) slidable on the pivot 58. A compression spring 136 loctaed between a hole 137 of the slide 133 and the lower end of the slide 59 around a rod 138 of this latter urges the slide 133 to contact the pivot 58 through the upper end of the slot 134. Furthermore, the slide 133 is provided with a toothed edge 139 meshing with a toothed wheel 141 in turn engaging a pinion 142. This latter is secured to a shaft 143 rotatable on the frame 26 and is secured to a crank lever 144 carrying a pin 146 engaging a notch 147 of a horizontal slide 148 adapted to control the speed changing device 79 (FIG. 7), which operates the advancement of the spindle 21.

The tool changing device operates as follows.

At the beginning of the operative cycle of a predetermined cutting tool 20 (FIG. 2), the spindle 21 is located in its upper position and therefore it is disengaged from the tools 20. Now the recorded program of work causes the contact 44 corresponding to the required tool 20 to be closed.

Figure 4:
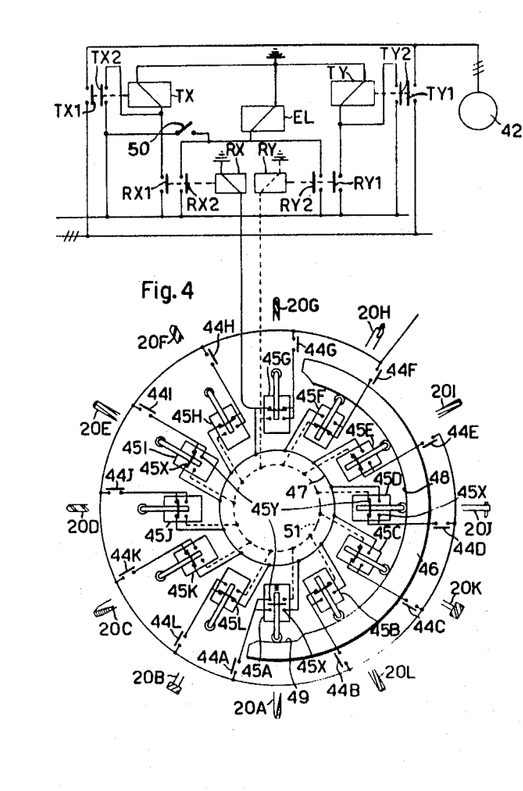
FIG. 4 is a diagrammatic view taken according to the line IV—IV of FIG. 2.

Assuming that the drum 17 is located with the tool 20A in alignment with the axis 22 of the spindle 21 as shown in FIG. 4, and that the contact 44I has been closed, since the corresponding switch 45I closes the contact 45X, the circuit 47 is closed thus energizing the relay RX. This latter, on one hand through the contact RX1 energizes the remote-control relay TX and causes the motor 42 to rotate in such a direction as to drive the drum 17 clockwise, on the other hand the contact RX2 energizes the electromagnet EL, which causes the clutch 34 (FIG. 7) to be engaged.

The shaft 41 (FIG. 3) of the motor 42, through the bevel gears 40, the shaft 39, the bevel gears 38 (FIG. 7), the shaft 37, the worm 36, the wheel 35 and the clutch 34, drives now the shaft 33 and the worm 32. This latter thus drives the wheel 29 (FIG. 2) together with the drum 17 clockwise as shown in FIG. 4, one step for each revolution of the shaft 33. At the end of each revolution of the shaft 33, the disk 55 causes the contact 50 to be open. However the electromagnet EL (FIG. 4) remains still energized through the contact RX2 of the relay RX.

Figure 5:
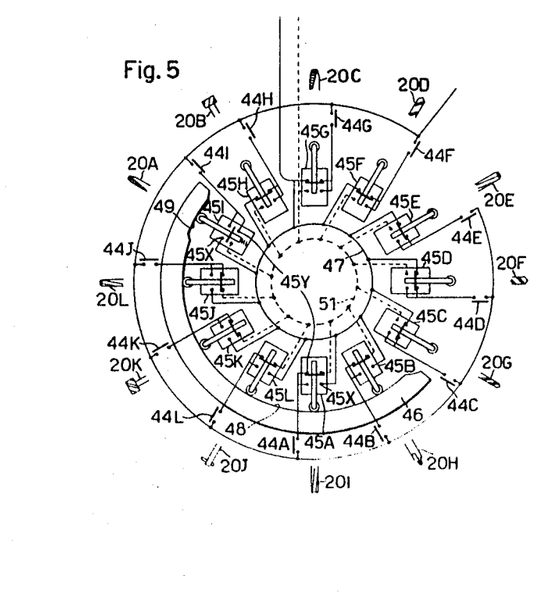
FIG. 5 is the view of FIG. 4 in a section position.

When the portion 49 of the cam 46 engages the switch 451 as shown in FIG. 5, this switch is moved to the intermediate position, whereby the corresponding contact 45X is open and the relay RX is de-energized. Now the contacts RX1 and RX2 are open, but the remote-control relay TX remains energized through the corresponding holding circuit and the electromagnet EL remains energized because the disk 55 by rotating causes the switch 50 to be closed. At the instant when the notch of the disk 55 (FIG. 2) causes the contact 50 to be open, the electromagnet EL (FIG. 4) is de-energized and causes the clutch 34 (FIG. 7) to be disengaged. Therefore, the drum 17 exactly stops when the selected tool 20I (FIG. 5) is in alignment with the spindle 21 (FIG. 2), while the electric motor 42 is still rotating in order to operate further phases of the cycle.

On the contrary, assuming that the cutting tool 20A (FIG. 4) is in alignment with the spindle, and that the contact 44D is closed, the circuit 51 is now established through the switch 45D and energizes the relay RY. Now the contact RY1 causes the remote-control relay TY to be energized, thus causing the motor 42 to rotate in opposite direction with respect to the above case, while the contact RY2 energizes the electromagnet EL as above stated. The drum 17 is now rotated counterclockwise and when the portion 48 of the cam 46 disengages the switch 45D, this latter is engaged by the portion 49 of the cam 46 and is moved to its intermediate position thus causing the relay RY to be de-energized. Then, when the shaft 33 (FIG. 2) completes its revolution, the disk 55 opens the contact 50, whereby the drum 17 is stopped while the motor 42 still rotates in a manner similar to the above case.

Upon stopping the drum 17, the clutch 53 is engaged in a known manner to rotate, through the worm 36 (FIG. 6), the wheel 52 and the clutch 53, the disk 54 180 degrees in either of the two directions according to the previous established rotation of the motor 42. The eccentric groove 56 of the disk 54, through the roller 57 and the pivot 58, moves the slide 59 downward through a constant stroke, equal to the eccentricity of the groove 56. Then the pivot 58 (FIG. 2) moves downwards the sleeve 62 together with the spindle 21. This latter engages the portion 107 of the socket 19 by means of the tapered recess 108, while the two projections 87 engage the two recesses 88. In turn the rod 112 follows the spindle 21 by reason of its weight till contacting the threaded hole 109 of the socket 19. The slide 59 upon reaching the end of its stroke in a known manner causes the auxiliary motor 119 (FIG. 3) to rotate in such a direction as to screw the rod 112 (FIG. 2) into the threaded hole 109 of the socket 19. When the collar 113 of the rod 112 contacts again the step 114, the spindle 21 is forced against the socket 19. Then the torque required to the motor 119 (FIG. 2) is increased, and disables the motor 119 in a known manner.

Thereafter the electromagnet 105 (FIG. 2) is energized, and the armature 104 through the flange 103 displaces the jaw 92 leftwards. This latter through its toothed edge 94 (FIG. 8), the two pinions 97 and the toothed edge 96 displaces the jaw 93 rightwards, whereby the socket 19 is unlocked. Simultaneously the electromagnet 127 (FIG. 3) is energized to lower the armature 126. Then the lever 123 is rocked clockwise and raises the sleeve 117, which thus disengages the fluted portion 116 of the rod 112.

The slide 59 (FIG. 2) upon being lowered, by means of the spring 136 urges the slide 133 downwards, until the stepped portion 132 contacts the stepped drum 128. The slide 133 thus accomplishes a stroke according to the angular position wherein the drum 128 has been set. The downward stroke of the slide 133, through the wheel 141 (FIG. 6), the pinion 142, the shaft 143, the crank lever 144 and the pin 146, is transferred to the slide 148, which controls the speed changing device 79 (FIG. 7) according to the advancement required by the selected tool 20.

Now the motor 42 (FIG. 3) is rotated in the direction required by the selected tool 20, and through the speed changing device 86, which has been automatically predisposed in a known manner, rotates the toothed wheel 84 together with the sleeve 83. This latter drives thus the spindle 21 together with the tool 20 already secured thereto through the rod 112. Simultaneously through the speed changing device 79 (FIG. 7), and the pinion 78, the sleeve 62 is caused to advance downwards together with the spindle 21.

The tool 20 is arrested and returned under the control of the position measuring transformer 71 (FIG. 3) in a manner known per se. When the spindle 21 is returned into the vertical initial position, the two speed changing devices 79 (FIG. 7) and 86 (FIG. 3) are disabled, while the electromagnet 105 (FIG. 8) is de-energized. Now the spring 106 urges the armature 104 to rest and the jaws 92 and 93 to lock the spindle 19, while the spindle 21 is still rotating due to its momentum. The jaws 92 and 93 completely lock the socket 19 only when the socket 19 reaches the angular position wherein it present the recesses 89 and 91 to the jaws 92 and 93 as shown in FIG. 2. Therefore, each tool 20 is locked on the drum 17 always in the same angular position.

Figure 3:
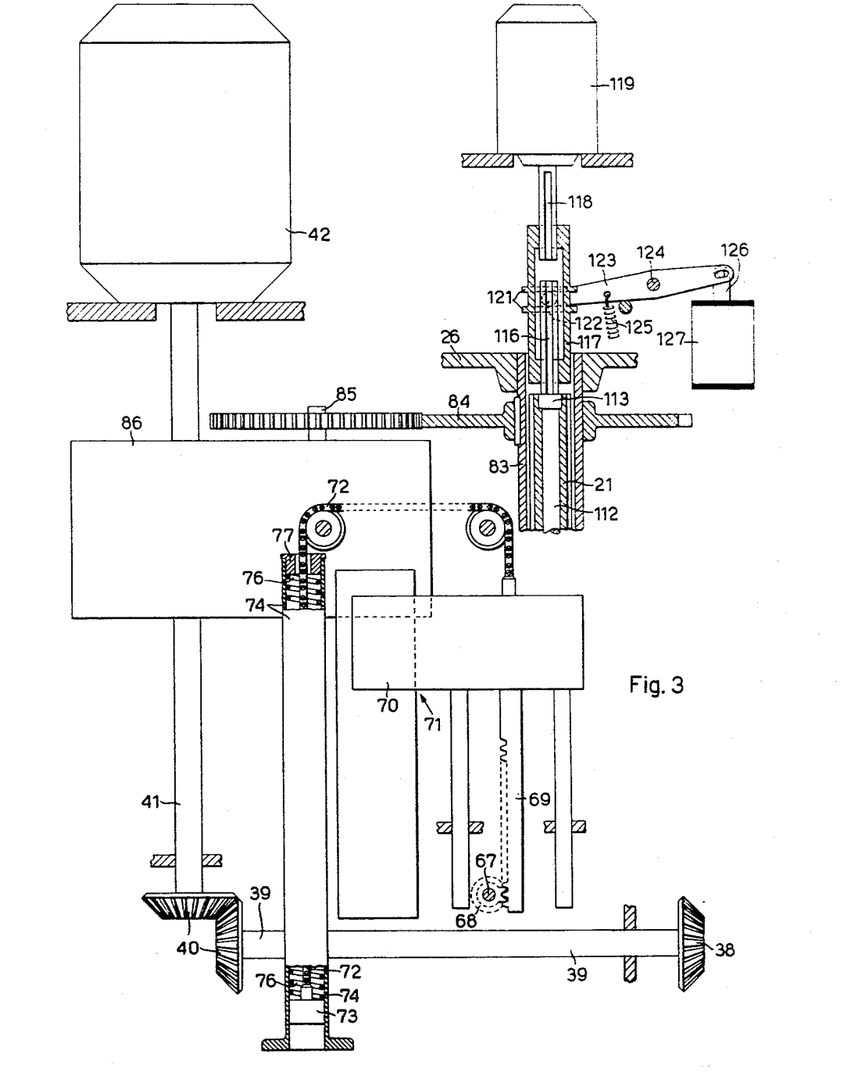
FIG. 3 is another partial longitudinal sectional view of the machine.

Thereafter the electromagnet 127 (FIG. 3) is de-energized and the spring 125 restores the lever 123 counterclockwise to the position shown in FIG. 3. Now the lever 123 returns the sleeve 117 downwards thus engaging the fluted portion 116 of the rod 112. Now the motor 119 is started and rotates in such a direction as to unscrew the end 111 (FIG. 2) of the rod 112 from the threaded hole 109 of the socket 19. Finally, the clutch 53 is engaged and rotates the disk 54 180 degrees to restore the slide 59 to its upper position. Then the pin 58 (FIG. 6) returns the slide 133 upwards, while the spring 76 (FIG. 3), through the chain 72, the rack 69 and the pinion 68, returns the sleeve 62 upwards together with the spindle 21, thus completing the operative cycle of the selected tool 20.

Some cutting tools may require a controlled displacement of the spindle 21 either during the downward advancing stroke only, as for example the drills 20D and 20G (FIG. 4) or during both their strokes, as for example the threading tools 20A and 20C. In order to alter the program of work according to the selected tool, so as to have or not a controlled displacement of the spindle 21 also during the return stroke, the stepped drum 128 (FIG. 6) is provided with two similar stepped portions 149 and 150, adapted to be set into operative position by rotating the knob 129 in a corresponding direction, the stepped portion 149 relating to a drilling tool, the stepped portion 150 relating to a threading tool. Furthermore the drum 128 is provided with a cam 151 adapted to engage a switch 152 secured to the frame 26, only when the drum 128 is set with the stepped portion 150 in operative position. Then the switch 152 closes a circuit causing the spindle 21 to be displaced upwards through a controlled speed in a known manner per se.

It is intended that many changes, improvements and additions of parts may be made to the described tool changing device without departing from the scope of the invention as defined in the appended claims.

What I claim is:

1. In a machine tool having a frame, an automatic tool changing device having a tool storage magazine rotatably mounted on said frame, a plurality of tools each one stored in a predetermined position in said magazine and movable therewith for being selectively located at a tool working station, and comprising in combination:
 (a) power means conditionable for rotating said magazine in either of two directions,
 (b) a plurality of elements associated with said tools and individually settable for selecting the associated tool,
 (c) a plurality of control members each one connected to one of said elements, said members being secured to said frame coaxially with said magazine in a reverse order with respect to said tools,
 (d) a cam secured to said magazine,
 (e) a first portion on said cam adapted to engage half but one of said plurality of members so as to cause the member connected with the element so set to condition said power means to rotate said magazine in a predetermined direction when engaged and in an opposite direction when not engaged,
 (f) and a second portion on said cam for engaging one of said members at a time, so as to disable said power means when the tool associated with said set element is located in said working station.

2. In a machine tool having a frame, an automatic tool changing device having a tool storage drum rotatably mounted on said frame, a plurality of tools each one stored in a predetermined position in said drum and movable therewith for being selectively located at a tool working station, and comprising in combination:
 (a) power means conditionable for rotating said drum in either of two directions,
 (b) a plurality of electric contacts associated with said tools and individually operable for selecting the associated tool,
 (c) a plurality of three-position switches each one series connected to one of said contacts, said switches being mounted on said frame coaxially with said drum in a reverse order with respect to said tools, each one of said switches connected to the contact so operated being adapted to condition said power means to rotate said drum in opposite directions when located at its two extreme positions and to disable said power means when located at an intermediate position,
 (d) means normally urging said switches in one of said extreme positions,
 (e) a semicircular cam secured to said drum,
 (f) a first portion on said cam adapted to engage half but one of said switches so as to displace same to the other extreme position,
 (g) and a second portion on said cam for engaging one of said switches at a time so as to displace same to said intermediate position.

3. In a machine tool having a frame, and a single spindle mounted on said frame for being rotated around a first axis, an automatic tool changing device having a tool storage magazine rotatably mounted on said frame around a second axis, said magazine being frusto-conical shaped and having a lateral surface inclined with respect to said second axis according to a predetermined angle, and comprising in combination:
 (a) a plurality of rotatively operable tools,
 (b) means for mounting said magazine with said second axis intersecting said first axis and inclined with respect to said first axis according to the complement of said predetermined angle,
 (c) a plurality of tool housing cells circumferentially arranged on said surface and each one adapted to house a corresponding one of said tools in a predetermined position with the axis thereof perpendicular to said surface,
 (d) power means for selectively rotating said magazine so as to locate a selected one of said tools in axial alignment with said spindle,
 (e) a plurality of electric contacts associated with said tools and individually operable for selecting the associated tool,
 (f) a plurality of three-position switches each one series connected to one of said contacts, said switches being mounted on said frame coaxially with said magazine in a reverse order with respect to said tools, each one of said switches connected to the contact so operated being adapted to condition said power means to rotate said magazine in opposite directions when located at its two extreme positions and to disable said power means when located at an intermediate position,
 (g) means normally urging said switches in one of said extreme positions,
 (h) a semicircular cam secured to said magazine,
 (i) a first portion on said cam adapted to engage half but one of said switches so as to displace same to the other extreme position,
 (j) a second portion on said cam for engaging one of said switches at a time so as to displace same to said intermediate position,
 (k) and displacing means for axially displacing said spindle upon alignment of said selected tool for operating same.

4. In a machine tool having a frame, and a single spindle mounted on said frame for being rotated around a first axis, an automatic tool changing device, having a tool storage magazine rotatably mounted on said frame around a second axis, said magazine being frusto-conical shaped and having a lateral surface inclined with respect to said second axis according to a predetermined angle, and comprising in combination:
 (a) a plurality of rotatively operable tools,
 (b) means for mounting said magazine with said second axis intersecting said first axis and inclined with respect to said first axis according to the complement to said predetermined angle,
 (c) a plurality of tool housing cells circumferentially arranged on said surface and each one adapted to house a corresponding one of said tools in a predetermined position with the axis thereof perpendicular to said surface,
 (d) power means for selectively rotating said magazine so as to locate a selected one of said tools in axial alignment with said spindle,
 (e) displacing means for axially displacing said spindle upon alignment of said selected tool for operating same,
 (f) a first worm wheel comprised in said power means,
 (g) an eccentric comprised in said displacing means,
 (h) a second worm wheel adapted to be connected to said eccentric,
 (i) and a single worm engaging said first and second worm wheels.

5. In a machine tool having a frame, and a single spindle mounted on said frame for being rotated around a first axis, an automatic tool changing device, having a tool storage magazine rotatably mounted on said frame around a second axis, said magazine being frusto-conical shaped and having a lateral surface inclined with respect to said second axis according to a predetermined angle, and comprising in combination:
 (a) a plurality of rotatively operable tools,
 (b) means for mounting said magazine with said second axis intersecting said first axis and inclined with respect to said first axis according to the complement to said predetermined angle,
 (c) a plurality of tool housing cells circumferentially arranged on said surface and each one adapted to house a corresponding one of said tools in a predetermined position with the axis thereof perpendicular to said surface,
 (d) power means for selectively rotating said magazine so as to locate a selected one of said tools in axial alignment with said spindle,
 (e) displacing means for axially displacing said spindle upon alignment of said selected tool for operating same, (f) a plurality of variably settable stepped elements associated with said tools and each one lying on the plane containing both said second axis and the axis of the associated tool, (g) a sensing member yieldably movable by said displacing means parallel to said spindle for sensing the stepped element associated with the selected tool for controlling the advancing stroke of said spindle, (h) a cam portion on each one of said elements, (i) and program altering means adapted to engage said cam portion for altering the program of operation of said spindle.

6. In a machine tool having a frame, and a single spindle mounted on said frame for being rotated around a first axis, an automatic tool changing device, having a tool storage magazine rotatably mounted on said frame around a second axis, said magazine being frusto-concial shaped and having a lateral surface inclined with respect to said second axis according to a predetermined angle, and comprising in combination:

(a) a plurality of rotatively operable tools, (b) means for mounting said magazine with said second axis intersecting said first axis and inclined with respect to said first axis according to the complement of said predetermined angle, (c) a plurality of tool housing cells circumferentially arranged on said surface and each one adapted to house a corresponding one of said tools in a predetermined position with the axis thereof perpendicular to said surface, (d) power means for selectively rotating said magazine so as to locate a selected one of said tools in axial alignment with said spindle, (e) displacing means for axially displacing said spindle upon alignment of said selected tool for operating same, (f) a tool holding member secured to each one of said tools and adapted to be connected to said spindle for being rotatively operated thereby, (g) a pair of opposite locking portions on said holding members, (h) a pair of jaws located into each one of said cells and engaging the locking portions of a corresponding holding member when not connected to said spindle, (i) a pinion rotatably mounted into each one of said cells, (j) at least a pair of toothed edges on each pair of said jaws oppositely engaging said pinion, (k) and means for causing cooperative movement of said jaws and said pinion when the corresponding tool is so aligned to oppositely move said pair of jaws.

7. A machining apparatus with a tool magazine turnable about an axis on a frame member to different tool-selective positions having power means controllable to rotate said magazine in a selected rotational direction about said axis to different desired tool-selective positions, a series of individual selective controls related to said different tool-selective positions of said magazine, and means responsive to said individual selective controls to cause said power means to rotate said magazine to the related tool-selective position in the rotational direction corresponding to the shortest distance thereto comprising:

a series of control devices circularly arranged around the axis of said magazine corresponding in number to the tool-selective positions of said magazine, each control device being selectively controllable to a first condition to potentially control said power means to rotate in one direction, a second condition to potentially control said power means to rotate in the opposite direction, and a third condition to control said power means to be idle, governing means cooperative with said series of control devices to selectively control the latter to any one of said three different conditions, said series of control devices and said governing means being oppositely located on said frame member and said magazine respectively, said governing means being effective through rotation of said magazine to control said series of control devices to any of said three conditions, said governing means in each tool-selective position of said magazine controlling said series of control devices to cause the particular control device corresponding to the then existing tool-selective position of the magazine to be controlled to said third condition, to cause a number of devices, not more than half of the remaining number of control devices, adjoining one side of said particular control device, to be controlled to said first condition, and to cause the remaining control devices to be controlled to said second condition, each of said control devices being responsive to the appropriate selective control so that said power means upon operation of any of said selective controls are operative to rotate said magazine in that rotational direction which will bring it within the shortest distance to its new tool-selective position.

8. The machining apparatus recited in claim 7, wherein said governing means comprises a cam member to cause said control devices to be controlled to the various conditions depending upon the changing position of said magazine, said cam member having a short sector and a circularly adjoining long sector, said short sector always adapted to cause one of said control devices to be controlled to said third condition while said long sector causes other control devices to be controlled to said first condition.

9. The machining apparatus recited in claim 7 further comprising:

a first solenoid associated with said power means to control said power means to rotate said magazine in one rotational direction and a second solenoid associated with said power means to control said power means to rotate in the opposite rotational direction, said control devices each consisting of a three-position switch having a first position adapted to enable a first electrical connection related to one of said first and second solenoids, a second position adapted to enable a second electrical connection related to the other solenoid, and a third position which is neutral, said selective controls each comprising switch means connectable in series with the first and second solenoids through said first and second electrical connections such that if any of said three-position switches is in said first position the power means will rotate the magazine in one rotational direction and if any of said three-position switches is in said second position the power means will rotate said magazine in the opposite rotational direction.

10. The machining apparatus recited in claim 8 further comprising:

a first solenoid associated with said power means to control said power means to rotate said magazine in one rotational direction and a second solenoid associated with said power means to control said power means to rotate in the opposite rotational direction, said control devices each consisting of a three position switch having a first position adapted to enable a first electrical connection related to one of said first and second solenoids, a second position adapted to enable a second electrical connection related to the other solenoid, and a third position which is neutral, said selective controls each comprising switch means connectable in series with the first and second solenoids through said first and second electrical connections such that if any of said three-position switches is in said first position the power means will rotate the magazine in one rotational direction and if any of said three-position switches is in said second position the power means will rotate said magazine in the opposite rotational direction.

11. A machine tool apparatus with automatic tool changer, having a frame, spindle, a tool storage drum, a plurality of tools removable located on said drum, power means for selectively rotating said drum in one of two opposite directions to locate a selected tool into a tool changing station through the shortest travel distance, and auxiliary means for connecting the tool located in said tool changing station with said spindle, comprising in combination:

a plurality of individually settable elements associated with said tools for selecting the associated tool, a plurality of control members individually connected to said elemnts and secured to the frame coaxially with said drum in reverse order with respect to said tools, and a semicircular cam secured to said drum and comprising a first portion adapted to engage one less than half of said plurality of control members to cause the control member connected with the element so set to condition the rotation of said drum in a predetermined direction when engaged and in the opposite direction when not engaged, said cam further comprising a second portion adapted to engage one control member at a time to stop and drum when the tool corresponding to said set element is located in said tool changing station.

12. The machine tool apparatus recited in claim 11 wherein said control members each comprises a three-position switch connected in series to a corresponding electric contact adapted to be individually actuated to select the associated tool, the switch connected to the contact so closed conditioning the rotation of said drum in opposite directions when located at its two extreme positions, and being adapted to stop said drum when located at an intermediate position, said switches being normally urged toward one of said extreme positions, said cam being adapted to displace the switches engaged by said first portion to the other extreme position and the switch engaged by said second portion to said intermediate position.

13. A machine tool apparatus with automatic tool changer including a spindle, a tool storage magazine having a plurality of tool storing cells, a plurality of tools each one housed in one of said cells, power means for selectively moving said magazine to locate a selected tool into a tool changing station, auxiliary means for connecting the tool located in said station with said spindle, and an adjustable speed changing device adapted to operate said spindle according to different speeds, comprising in combination:

a plurality of variably presettable members associated with said cells, each one mounted on said magazine in correspondence with the associated cells and being preset according to the speed of said spindle requisite by the selected tool, a first stepped edge provided on each one of said presettable members, a slide yieldably movable toward the presettable member associated with the selected tool when said magazine locates said selected tool into said station, a second stepped edge provided on said slide opposite to the first stepped edge of said associated presettable member for sensing the first stepped edge, and means conditioned by said slide to adjust said speed changing device to operate said spindle according to said requisite speed.

14. A machine tool apparatus with automatic tool changer including a spindle, a tool storage magazine having a plurality of tool storing cells, a plurality of tools each one housed in one of said cells, power means for selectively moving said magazine to locate a selected tool into a tool changing station, auxiliary means for connecting the tool located in said station with said spindle, and an adjustable speed changing device adapted to operate said spindle according to different speeds, comprising in combination:

a plurality of hollow drums associated with said cells, each one mounted on said magazine in correspondence with the associated cell, a manipulative knob connected with each of said hollow drums for angularly presetting the same in an angular position corresponding to the speed of said spindle requisite by the selected tool, an arcuate stepped edge provided on each of said hollow drums, a slide yieldably slidable perpendicularly to the axis of the hollow drum corresponding to the selected tool when said magazine locates said selected tool into said tool changing station, a further stepped edge provided on said slide opposite to the arcuate stepped edge of said associated hollow drum for sensing the arcuate stepped edge, and means conditioned by said slide to adjust said speed changing device to operate said spindle according to said requisite speed.

15. A machine tool apparatus with automatic tool changer, including a frame, a spindle mounted on said frame, a tool storage drum having a plurality of tool storing cells, a plurality of tools each one housed in one of said cells, power means for selectively moving said storage drum to locate a selected tool in alignment with said spindle, auxiliary means conditionable for connecting the tool so aligned with said spindle and an adjustable speed changing device adapted to operate said spindle according to different speeds, comprising in combination:

a sleeve rotatably mounting said spindle axially shiftable for conditioning said auxiliary means, a plurality of hollow drums associated with said cells, each one mounted on said storage drum in correspondence with the associated cell, a manipulative knob connected with each of said hollow drum for angularly presetting the same in an angular position corresponding to the speed of said spindle requisite by the selected tool, a first arcuate stepped edge provided on each of said hollow drums, a slide slidable on said frame parallel to the axis of said sleeve and perpendicularly to the axis of the hollow drum corresponding to the tool so aligned, a further stepped edge provided on said slide opposite to the arcuate stepped edge of said associated hollow drum for sensing the arcuate stepped edge, yieldable means for causing said slide to sense said corresponding hollow drum, and means conditioned by said slide to adjust said speed changing device to operate said spindle according to said requisite speed.

16. The machine tool apparatus according to claim 17 wherein said power means comprise in combination:

a first worm wheel adapted to be connected with said drum through a first clutch, an eccentric adapted to be rotated 180 degrees for shifting said sleeve, a second worm wheel adapted to be connected with said eccentric through a second clutch, and a continuously rotating single worm gear simultaneously meshing with said first and second worm wheels.

17. The machine tool apparatus according to claim 16 wherein said eccentric is formed by an annular groove provided eccentrically on a disk adapted to be rotated each time 180 degrees, comprising in combination:

a sliding member slidable on the machine frame parallel to said sleeve, and a cam follower secured to said sliding member and engaging said groove, said cam follower being adapted to positively trail said sleeve towards the aligned tool, said yieldable means being provided between said slide and said sliding member.

18. The machine tool apparatus according to claim 17 further comprising in combination:

a rod secured to said sliding member, and a hollow defined by said slide aligned with said rod, said yieldable means comprising a compression spring housed within said hollow and guided by said rod.

19. The machine tool apparatus according to claim 18 further comprising in combination:

a slot on said slide cooperative with said cam follower, a toothed edge provided on said slide, a member movable for controlling said speed changing device, and a pinion engaging said toothed edge for moving said member.

20. The machine tool apparatus according to claim 15 wherein said speed changing device controls the rate of the axial feeding movement of said sleeve and said spindle and further comprising in combination:

a second arcuate stepped edge symmetrically disposed on each one of said hollow drums with respect to said first arcuate stepped edge, each of said arcuate stepped edges lying substantially on an arc of 180° of the base of said hollow drums, a program altering member mounted on the frame operable to cause said speed changing device to return said spindle to a speed different of the requisite speed, and a cam provided on said hollow drum and associated with one of said first and second arcuate stepped edges, said cam operating said program altering member when the associated arcuate stepped edge is so sensed.

21. A machine tool apparatus with automatic tool changer having a frame, a spindle, a tool storage magazine provided with a series of tool storing cells, each adapted to store a tool secured to a corresponding tool supporting element, power means for selectively displacing said magazine to locate a selected tool in a working station to be successively secured to said spindle, comprising in combination:

at least a first recess on each of said tool supporting elements, a locking member located in each of said cells and normally engaging said recess, a control element mounted on the frame adapted to engage a portion of said locking member when the corresponding tool is so located, said portion being shaped so as not to interfere with said control element during the displacement of said magazine, and means to operate said control element for causing the locking member of the so located tool to be disengaged from the first recess of said tool supporting element.

22. The machine tool apparatus according to claim 21 further comprising in combination:

a second recess on each tool supporting element, said first and second recesses being diametrically opposite and axially offset, a pair of jaws mounted on each of said cells normally engaging said recesses, a pair of toothed edges provided on said jaws to clamp said tool supporting element in an angularly defined position, and a pinion rotatably mounted within each one of said cells, both said toothed edges engaging two diametrically opposite sides of said pinion to move said jaws simultaneously in opposite directions.

23. The machine tool apparatus according to claim 22 wherein said portion is C-shaped and further comprising in combination:

a flange integral with said control element and adapted to pass within the C-shaped portion, a telescopic armature of an electromagnet secured to said control element, and a spring urged dentent ball to hold said locking member in a first position in which it is engaged with said recess or in a second position in which it is disengaged from said recess.

24. The machine tool apparatus according to claim 23 further comprising in combination:

a second recess on each tool supporting element, said first and second recesses being diametrically opposite and axially offset, a pair of jaws mounted on each of said cells normally engaging said recesses, a pair of toothed edges provided on said jaws to clamp said tool supporting element in an angularly defined position, and a pinion rotatably mounted within each one of said cells, both said toothed edges engaging two diametrically opposite sides of said pinion to move said jaws simultaneously in opposite directions.

25. A machine tool apparatus with automatic tool changer having a frame, a single spindle mounted on said frame for being rotated around a first axis, a non-rotatable sleeve rotatably mounting said spindle and slidable along said first axis, a tool storage drum rotatably mounted on said frame around a second axis, said drum being hollow frusto-conical shaped and having a lateral surface tapered with respect to said second axis according to a predetermined angle less than 90 degrees, comprising in combination:

a plurality of rotatably operable tools, means for mounting said drum with said second axis intersecting said first axis and inclined with respect to said first axis according with the complement to said predetermined angle, a plurality of tool housing cells circumferentially arranged on said surface, each adapted to house a corresponding one of said tools in a predetermined position with the axis thereof perpendicular to said surface, power means for selectively rotating said drum so as to locate a selected one of said tools in axial alignment with said spindle, first power operable displacing means for axially displacing said sleeve upon alignment of said selected tool for engaging same, coupling means operable to couple said spindle with said selected tool for concomitant rotation, and power operable second displacing means for axially displacing said sleeve upon operation of said coupling means for imparting an axial feeding movement to said spindle.

26. The machine tool apparatus according to claim 25 further comprising in combination:

an eccentric comprised in said first displacing means and adapted to be rotated 180 degrees for displacing said sleeve, a first worm wheel adapted to be connected with said drum through a first clutch, a second worm wheel adapted to be connected with said eccentric through a second clutch, and a continuously rotating single worm gear simultaneously meshing with said first and second worm wheels.

27. A machine tool according to claim 26 further comprising in combination:

a rod comprised in said coupling means, said rod being rotatable and slidable within said spindle, a threaded hole provided by each of said tool supporting members, a threaded end on said rod adapted to be screwed into said hole, and means to rotate said rod after said spindle has been axially displaced towards a selected tool to secure the latter to said spindle.

28. A machine tool apparatus according to claim 25 further comprising in combination:

a rod comprised in said coupling means, said rod being rotatable and slidable within said spindle, a threaded hole provided by each of said tool supporting members, a threaded end on said rod adapted to be screwed into said hole, and means to rotate said rod after said spindle has been axially displaced towards a selected tool to secure the latter to said spindle.

References Cited

UNITED STATES PATENTS

| | | | |
|---|---|---|---|
| 1,270,121 | 6/1918 | Cox | 77—25 |
| 2,887,894 | 5/1959 | Charlat | 77—25 XR |
| 2,952,170 | 9/1960 | Hansen et al. | 77—25 |

FRANCIS S. HUSAR, Primary Examiner

U.S. Cl. X.R.

10—128; 29—26

UNITED STATES PATENT OFFICE
CERTIFICATE OF CORRECTION

Patent No. 3,473,419 October 21, 1969

Giorgio Ollearo

It is certified that error appears in the above identified patent and that said Letters Patent are hereby corrected as shown below:

Column 1, line 34, after "machine" insert -- tool --; line 65, "section" should read -- second --. Column 2, line 38, after "shaft" insert -- 33 --. Column 5, line 10, "451" should read -- 45I --; line 12, "RX1" should read -- RXI --. Column 11, line 19 "elemnts" should read -- elements --. Column 12, line 60, "17" should read -- 15 --.

Signed and sealed this 12th day of January 1971.

(SEAL)
Attest:

Edward M. Fletcher, Jr.
Attesting Officer

WILLIAM E. SCHUYLER, JR.
Commissioner of Patents